Aug. 24, 1948.    G. R. PURIFOY    2,447,666
DYNAMIC BRAKING SYSTEM FOR SERIES MOTORS
Filed May 7, 1946    3 Sheets-Sheet 1

WITNESSES:

INVENTOR
George R. Purifoy.
BY
ATTORNEY

Aug. 24, 1948.　　　　G. R. PURIFOY　　　2,447,666
DYNAMIC BRAKING SYSTEM FOR SERIES MOTORS
Filed May 7, 1946　　　　　　　　　　　　3 Sheets-Sheet 3

WITNESSES:

INVENTOR
George R. Purifoy.
BY
ATTORNEY

Patented Aug. 24, 1948

2,447,666

UNITED STATES PATENT OFFICE 2,447,666

DYNAMIC BRAKING SYSTEM FOR SERIES MOTORS

George R. Purifoy, Pittsburgh, Pa., assignor to Westinghouse Electric Corporation, East Pittsburgh, Pa., a corporation of Pennsylvania Application May 7, 1946, Serial No. 667,757

5 Claims. (Cl. 318—381)

My invention relates, generally, to control systems and, more particularly, to systems for controlling the operation of the propelling motors of electric vehicles.

During the operation of electrically propelled vehicles it is essential that the dynamic braking current be kept within certain limits to prevent flashing of the motors when operating at very high vehicle speeds. Otherwise the motor voltage will exceed the commutating limits established for the motors when designed.

An object of my invention, generally stated, is to provide a motor control system which shall be simple and efficient in operation and which may be economically manufactured and installed.

A more specific object of my invention is to prevent overvoltage of the motors of a vehicle during dynamic braking at high speeds.

Another object of my invention is to provide for automatically recalibrating a current limit relay during the operation of a dynamic braking control system.

Other objects of my invention will be explained fully hereinafter or will be apparent to those skilled in the art.

In accordance with one embodiment of my invention, during dynamic braking the operation of the resistor-shunting and the field-shunting switches of a motor control system of the interlock progression type is controlled by a current limit relay in the usual manner provided the car speed and hence the braking current and the motor voltage do not exceed a predetermined amount. If the braking current and voltage are excessive, the operation of the field-shunting switches is controlled by a separate relay responsive to the braking current. As the car speed decreases, the limit relay assumes control of the resistor-shunting switches and the limit relay is recalibrated during the progression of these switches.

Figure 1A:
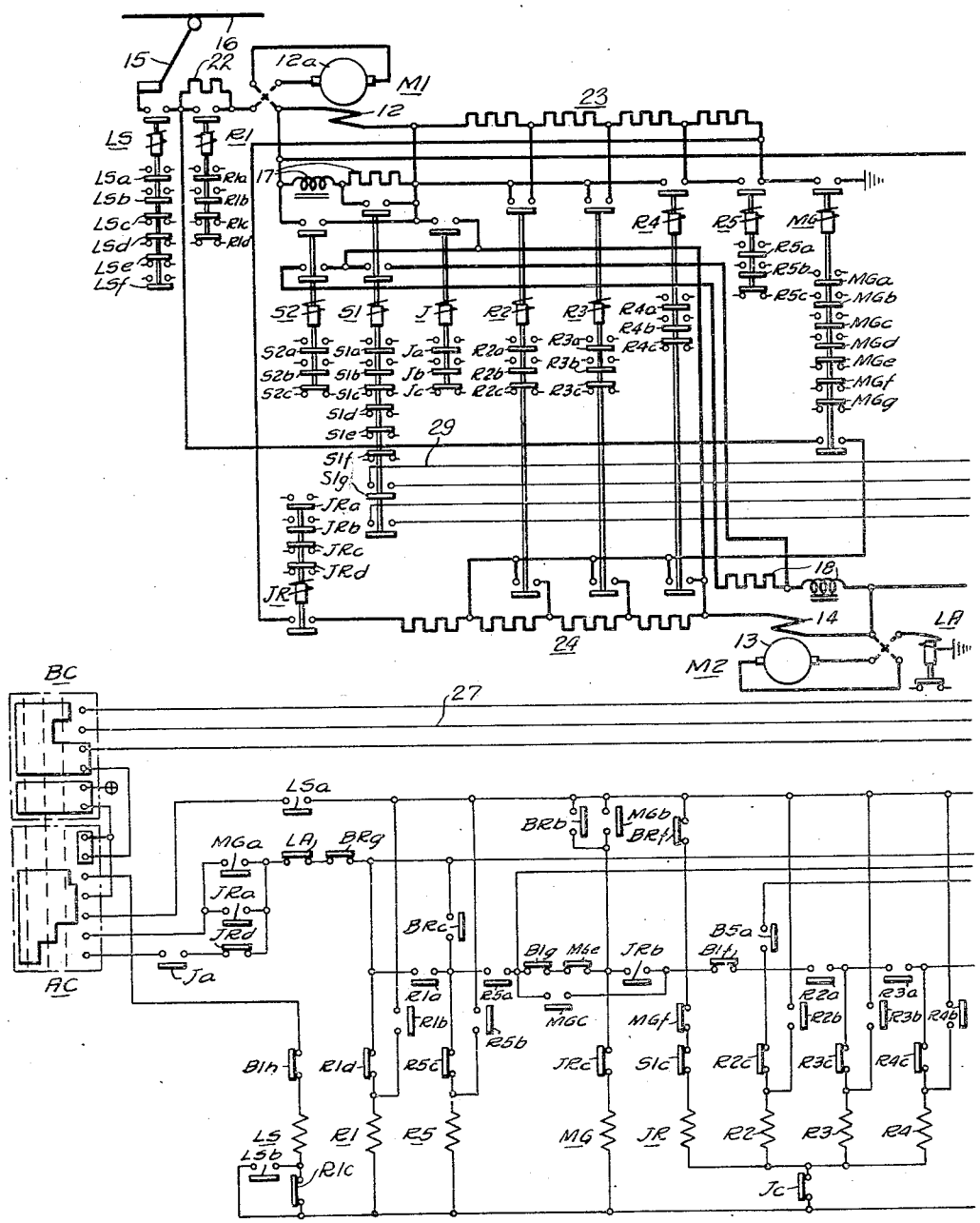
Figure 1B:
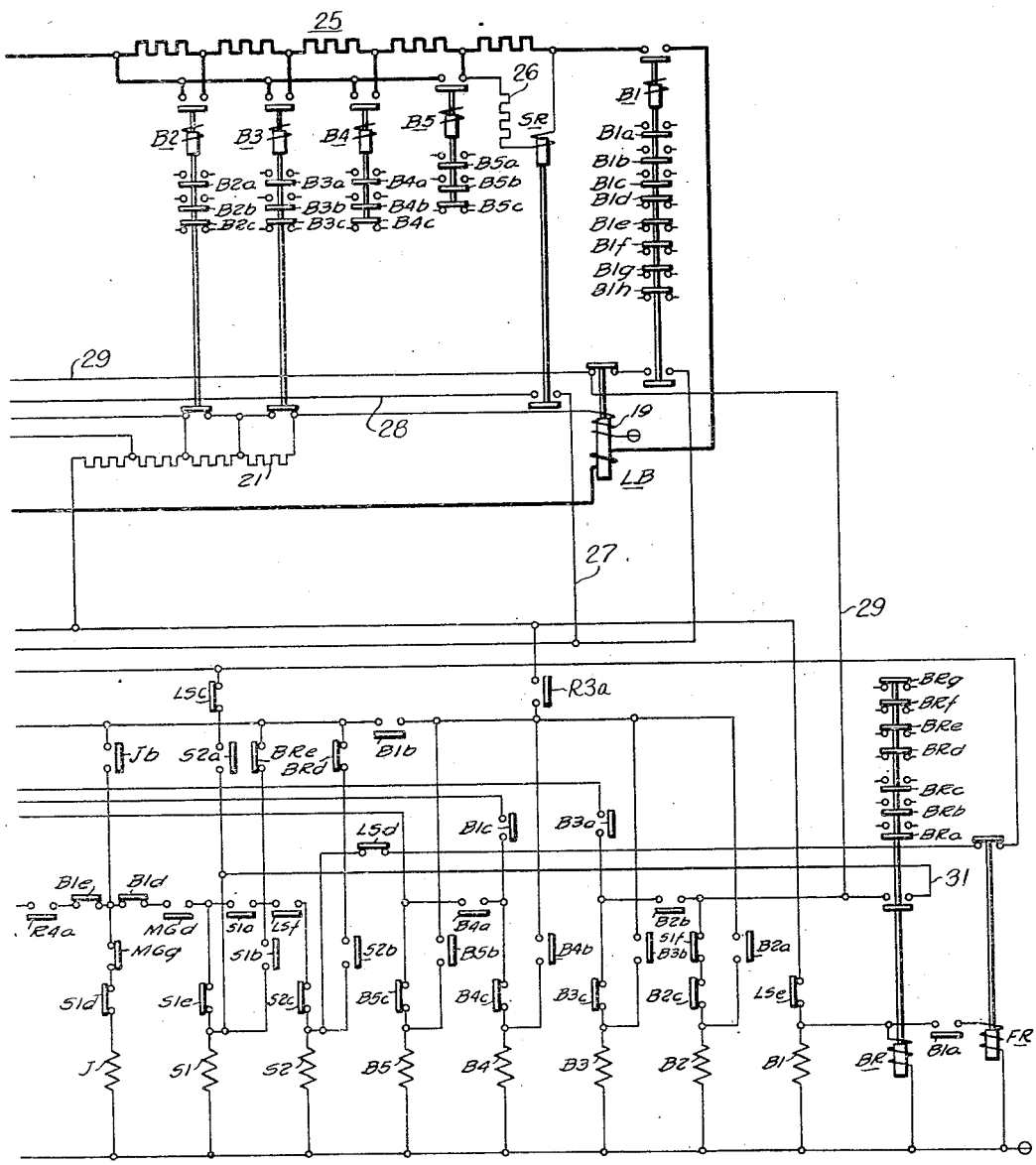
Figures 2, 3:
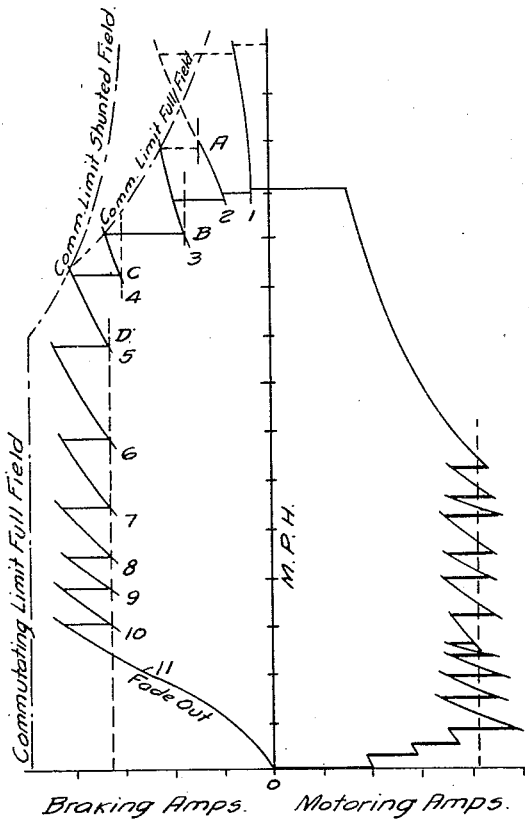

For a fuller understanding of the nature and objects of my invention, reference may be had to the following detailed description, taken in conjunction with the accompanying drawings, in which:

Figures 1A and 1B, when combined, constitute a diagrammatic view of a control system embodying the principal features of my invention;

Fig. 2 is a chart showing the sequence of operation of part of the apparatus illustrated in Figs. 1A and 1B, and Fig. 3 is a set of curves illustrating the performance of the control system.

Referring to the drawings, the system shown therein comprises a pair of motors M1 and M2 which may be of a type suitable for propelling an electric vehicle (not shown). The motor M1 is provided with an armature winding 12a and a series field winding 12. The motor M2 is provided with an armature winding 13 and a series field winding 14. Power for operating the motors may be supplied through a current collector 15 which engages a trolley conductor 16. The conductor 16 may be energized from any suitable source of power, such as a power generating station (not shown).

In accordance with the usual practice, the motors M1 and M2 may be connected to the power source by means of a line switch LS. As indicated by the sequence chart in Fig. 2, the motors are first connected in series-circuit relation by means of a switch JR and then in parallel-circuit relation by means of a switch MG. A switch J is closed only during the transition from series to parallel.

In accordance with the usual practice, a plurality of resistor-shunting switches R1, R2, R3, R4 and R5, which shunt resistors 22, 23, and 24 step-by-step, are provided for controlling the motor current during the acceleration of the vehicle. The control system is of the interlock progression type. The sequential operation of the resistor-shunting switches is controlled by interlocks on the switches in conjunction with a limit relay LA which is responseive to the motor current and functions in a manner well known in the art to so control the operation of the resistor-shunting switches that the motor current does not exceed a predetermined amount during the accelerating cycle.

Field-shunting switches S1 and S2 are provided for shunting the field windings of the motors M1 and M2 through combined resistance and reactance shunts 17 and 18, respectively. The field shunting is utilized to increase the maximum speed of the motors in a manner well known in the art, and also to control the motor current during dynamic braking, as will be explained more fully hereinafter.

Provision is made for decelerating the vehicle by means of dynamic braking, the dynamic braking circuit for the motors being established by a switch B1. A plurality of resistor-shunting switches B2, B3, B4 and B5, which shunt a resistor 25 step-by-step, are utilized to control the dynamic braking current in conjunction with the resistor-shunting switches R1 to R5 inclusive, and the field-shunting switches S1 and S2. A current limit relay LB is provided for controlling the sequential operation of the resistor-shunting switches during dynamic braking under normal conditions of service. A manually operable controller AC is provided by controlling the operation of the vehicle during acceleration and a controller BC is provided for controlling the dynamic braking of the vehicle.

As explained hereinbefore, it is necessary that the dynamic braking current be kept within certain values when the vehicle is operating at high speeds in order to prevent flashing of the motors as a result of the motor voltage exceeding the commutating limits established by the motor designers. In the present system this is accomplished by means of a relay SR which so controls the operation of the field-shunting switches and the resistor-shunting switches that the motor voltage is kept within the commutating limits of the motors. As shown, the actuating coil of the relay SR is connected across a section of the dynamic braking resistor 25 in series with a resistor 26 and is, therefore, responsive to the braking current which, in turn, is proportional to the speed and voltage of the motors.

If the car is operating below a predetermined speed when dynamic braking is applied, the field-shunting switches and the resistor-shunting switches are operated in the usual manner under the control of the current limit relay LB. The sequence of operation of these switches is shown in the chart in Fig. 2 and the operation of the switches is entirely controlled by the current limit relay LB and the interlocks actuated by the switches in a manner well known in the art.

However, if the car is operating at sufficient speed to generate enough dynamic braking current to cause the operation of the relay SR, the progression of the resistor-shunting switches is held up by the operation of the field-shunting switches which, in turn, is controlled by the relay SR. Furthermore, the current limit relay LB is recalibrated in successive steps by means of a coil 19 on the limit relay and a resistor 21 which is shunted from the energizing circuit for the coil 19 by means of interlocks actuated by certain of the field-shunting switches and the resistor-shunting switches.

As indicated by the sequence chart in Fig. 2, the field-shunting switches S1 and S2, the braking switch B1 and a braking relay BR are closed when the dynamic braking circuit is established. Following the closing of the braking switch B1, a relay FR is energized which opens its contact members to deenergize the field-shunting switch S2, thereby reducing the field-shunting effect on the motors which causes an increase in the motor current.

If the braking current is sufficient to operate the relay SR to close its contact members, the field-shunting switch S1 is prevented from opening by means of a holding circuit established from the controller BC through conductor 27, the contact members of the relay SR, conductor 28, an interlock S1g on the switch S1, conductor 29, the contact members of the braking relay BR, and conductor 31 to the coil of the switch S1. Thus, the field-shunting switch S1 is prevented from opening which, in turn, prevents the progression of the resistance-shunting switches B2 to B5 and R1 to R5.

Referring to the notching curves shown in Fig. 3, it will be seen that as the speed of the vehicle decreases, the motor current will decrease to a value indicated by "A" on the notching curve 2. When the current decreases sufficiently, the contact members of the relay SR are opened, thereby permitting the field-shunting switch S1 to open. As the field-shunting switch S1 is opened, the calibration of the limit relay LB is changed from a current setting having a value of "A" to a value of "B." As explained hereinbefore, the change of setting of the limit relay LB is accomplished by changing the resistance in series with the coil 19 by means of interlocks on the switches S1, B2 and B3.

When the motor current decreases to a point indicated by "B" on the curve 3, the contact members of the limit relay LB are closed, thereby causing the switch B2 to close to shunt a portion of the dynamic braking resistors from the motor circuit. As the switch B2 is closed, the limit relay setting is changed from the value "B" to the value "C."

When the motor current decreases to the point "C" on the curve 4, the switch B3 is closed thereby further decreasing the resistance in the dynamic braking circuit. The setting of the limit relay is changed from the value "C" to the value "D." The current setting "D" corresponds to a normal setting for the current limit relay and the progression of the resistor-shunting switches proceeds under the control of the current limit relay, as indicated by the sequence chart in Fig. 2 and the notching curves 5 to 11 inclusive, in Fig. 3. In this manner, the motor current and the motor voltage are kept within the commutating limits of the motors, as indicated by the notching curves in Fig. 3.

From the foregoing description it is apparent that I have provided a system suitable for controlling the operation of electrical vehicles, such as street cars and subway or rapid transit cars. The present system permits the application of dynamic braking at all car speeds without the motor voltage exceeding the commutating limit of the motors. The improvement herein described may be readily incorporated in present systems and applied on vehicles by utilizing a relatively small amount of additional apparatus.

Since numerous changes may be made in the above-described construction and different embodiments of the invention may be made without departing from the spirit and scope thereof, it is intended that all matter contained in the foregoing description or shown in the accompanying drawing shall be considered as illustrative and not in a limiting sense.

I claim as my invention:

1. In a motor control system, in combination, a direct current motor of the series type for propelling a vehicle, power conductors, switching means for connecting the motor to the power conductors, switching means for establishing dynamic braking connections for the motor, resistance means for controlling the motor current during dynamic braking, resistor-shunting switches for shunting said resistance means, said resistor-shunting switches being operable in sequential relation, field-shunting switches, relay means responsive to the dynamic braking current for controlling the operation of said field-shunting switches, additional relay means responsive to the motor current for controlling the sequential operation of said resistor-shunting switches, and interlocking means on said switches for causing said additional relay means to be recalibrated.

2. In a motor control system, in combination, a direct current motor of the series type for propelling a vehicle, power conductors, switching means for connecting the motor to the power conductors, switching means for establishing dynamic braking connections for the motor, resistance means for controlling the motor current during dynamic braking, resistor-shunting switches for shunting said resistance means, said resistor-shunting switches being operable in sequential relation, switches for shunting the motor field when dynamic braking is established, relay means responsive to the dynamic braking current for controlling the opening of said field-shunting switches, additional relay means responsive to the motor current for controlling the sequential operation of said resistor-shunting switches, and interlocking means actuated by said switches for causing said additional relay means to be recalibrated during the operation of the system.

3. In a motor control system, in combination, a direct current motor of the series type for propelling a vehicle, power conductors, switching means for connecting the motor to the power conductors, switching means for establishing dynamic braking connections for the motor, resistance means for controlling the motor current during dynamic braking, resistor-shunting switches for shunting said resistance means, said resistor-shunting switches being operable in sequential relation, switches for shunting the motor field when dynamic braking is established, relay means responsive to the dynamic braking current for controlling the opening of said field-shunting switches, and additional relay means responsive to the motor current for controlling the sequential operation of said resistor-shunting switches, the starting of said sequential operation being dependent upon the opening of said field-shunting switches, said additional relay means being recalibrated during the operation of said switches.

4. In a motor control system, in combination, a direct current motor of the series type for propelling a vehicle, power conductors, switching means for connecting the motor to the power conductors, switching means for establishing dynamic braking connections for the motor, resistance means for controlling the motor current during dynamic braking, resistor-shunting switches for shunting said resistance means, said resistor-shunting switches being operable in sequential relation, field-shunting switches, relay means responsive to the dynamic braking current for controlling the operation of said field-shunting switches, and additional relay means responsive to the motor current for controlling the sequential operation of said resistor-shunting switches, said additional relay means being recalibrated during the sequential operation of said switches.

5. In a motor control system, in combination, a direct current motor of the series type for propelling a vehicle, power conductors, switching means for connecting the motor to the power conductors, switching means for establishing dynamic braking connections for the motor, resistance means for controlling the motor current during dynamic braking, resistor-shunting switches for shunting said resistance means, said resistor-shunting switches being operable in sequential relation, field-shunting switches, relay means responsive to the dynamic braking current for controlling the operation of said field-shunting switches, additional relay means responsive to the motor current for controlling the sequential operation of said resistor-shunting switches, and means actuated by said switches for recalibrating said additional relay means.

GEORGE R. PURIFOY.

REFERENCES CITED

The following references are of record in the file of this patent:

UNITED STATES PATENTS

| Number | Name | Date |
|---|---|---|
| 2,436,330 | Purifoy | Feb. 17, 1948 |